United States Patent
Jain

(10) Patent No.: US 10,772,002 B2
(45) Date of Patent: Sep. 8, 2020

(54) SELECTIVE PROBE-RESPONSE SUPPRESSION BASED ON SNR

(71) Applicant: ARRIS Enterprises LLC, Suwanee, GA (US)

(72) Inventor: Gagan Jain, San Jose, CA (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 15/920,093

(22) Filed: Mar. 13, 2018

(65) Prior Publication Data

US 2019/0289488 A1 Sep. 19, 2019

(51) Int. Cl.
*H04W 28/02* (2009.01)
*H04W 48/08* (2009.01)
(Continued)

(52) U.S. Cl.
CPC ...... *H04W 28/0205* (2013.01); *H04B 17/336* (2015.01); *H04W 24/02* (2013.01); *H04W 28/0289* (2013.01); *H04W 48/08* (2013.01); *H04B 7/022* (2013.01); *H04W 8/02* (2013.01); *H04W 28/0236* (2013.01); *H04W 36/30* (2013.01); *H04W 48/14* (2013.01); *H04W 48/20* (2013.01); *H04W 88/08* (2013.01)

(58) Field of Classification Search
CPC . H04W 28/0205; H04W 24/02; H04W 48/08; H04W 48/20; H04W 8/02; H04W 36/30; H04W 88/08; H04W 28/0236; H04B 17/336; H04B 7/022
See application file for complete search history.

(56) References Cited

U.S. PATENT DOCUMENTS 6,580,700 B1 * 6/2003 Pinard ............... G06K 17/0022
370/332
7,965,686 B1 * 6/2011 Bridge .................. H04W 48/20
370/332

(Continued)

FOREIGN PATENT DOCUMENTS

EP 3108694 B1 2/2018

OTHER PUBLICATIONS

International Search Report & Written Opinion, Re: Application No. PCT/US2019/020169, dated Apr. 17, 2019.

*Primary Examiner* — Brian T O Connor
(74) *Attorney, Agent, or Firm* — Steven Stupp; Stewart Wiener

(57) ABSTRACT

An access point that selectively provides a probe response is described. During operation, the access point may receive a probe request associated with an electronic device. In response, the access point may selectively provide the probe response based at least in part on a signal-to-noise ratio (SNR) associated with the probe request and a threshold value. For example, the probe response may be provided when the SNR is greater than the threshold value, and otherwise the probe request may be discarded or ignored. Moreover, the access point may dynamically determine the threshold value based at least in part on: one or more other access points that are in wireless communication range of the access point; SNRs associated with the one or more other access points; and/or an estimated wireless coverage provided by the one or more other access points.

20 Claims, 7 Drawing Sheets

(51) Int. Cl.
*H04B 17/336* (2015.01)
*H04W 24/02* (2009.01)
*H04W 88/08* (2009.01)
*H04B 7/022* (2017.01)
*H04W 36/30* (2009.01)
*H04W 8/02* (2009.01)
*H04W 48/20* (2009.01)
*H04W 48/14* (2009.01)

(56) References Cited

U.S. PATENT DOCUMENTS

| | | | | |
|---|---|---|---|---|
| 8,134,985 | B2* | 3/2012 | Hong | H04B 7/022 |
| | | | | 370/338 |
| 8,781,487 | B2* | 7/2014 | Backes | H04L 47/125 |
| | | | | 455/452.1 |
| 9,094,789 | B2* | 7/2015 | Jeyaseelan | H04W 8/02 |
| 9,161,293 | B2* | 10/2015 | Choudhary | H04W 48/14 |
| 9,451,563 | B2* | 9/2016 | Zhou | H04W 24/08 |
| 9,467,953 | B2* | 10/2016 | Emmanuel | H04W 52/283 |
| 9,807,813 | B2 | 10/2017 | Hart et al. | |
| 9,877,251 | B2* | 1/2018 | Stager | H04W 84/005 |
| 10,021,529 | B2* | 7/2018 | Narasimhan | H04B 17/318 |
| 2008/0080388 | A1 | 4/2008 | Dean et al. | |
| 2011/0307609 | A1 | 12/2011 | Rangarajan et al. | |
| 2013/0077505 | A1* | 3/2013 | Choudhary | H04W 48/14 |
| | | | | 370/252 |
| 2014/0126388 | A1* | 5/2014 | Shin | H04W 48/20 |
| | | | | 370/252 |
| 2014/0355589 | A1 | 12/2014 | Yang et al. | |
| 2015/0065126 | A1* | 3/2015 | Jung | H04W 48/16 |
| | | | | 455/434 |
| 2015/0282053 | A1* | 10/2015 | Kneckt | H04W 48/16 |
| | | | | 370/329 |
| 2015/0304942 | A1 | 10/2015 | Wentink | |
| 2016/0112944 | A1* | 4/2016 | Zhou | H04W 36/0072 |
| | | | | 370/338 |
| 2016/0255511 | A1 | 9/2016 | Jeong et al. | |
| 2016/0255661 | A1* | 9/2016 | Siraj | H04W 76/10 |
| | | | | 370/338 |
| 2016/0309537 | A1 | 10/2016 | Hart et al. | |
| 2016/0353492 | A1 | 12/2016 | Park et al. | |
| 2017/0171833 | A1* | 6/2017 | Vamaraju | H04W 60/04 |
| 2017/0367055 | A1* | 12/2017 | Emmanuel | H04W 52/283 |
| 2018/0279130 | A1* | 9/2018 | Huang | H04W 24/02 |
| 2020/0008095 | A1* | 1/2020 | Patil | H04W 4/06 |

* cited by examiner

SELECTIVE PROBE-RESPONSE SUPPRESSION BASED ON SNR

BACKGROUND

Field

The described embodiments relate to techniques for an access point selectively transmitting a probe response in response to a probe request from an electronic device.

Related Art

Many electronic devices are capable of wirelessly communicating with other electronic devices. For example, these electronic devices can include a networking subsystem that implements a network interface for: a cellular network (UMTS, LTE, etc.), a wireless local area network (e.g., a wireless network such as described in the Institute of Electrical and Electronics Engineers (IEEE) 802.11 standard or Bluetooth from the Bluetooth Special Interest Group of Kirkland, Wash.), and/or another type of wireless network.

In a wireless network based on an IEEE 802.11 standard, an electronic device often actively scans for a nearby operating access point by transmitting a probe request. In response to receiving a probe request, an access point typically transmits a probe response.

However, in a crowded wireless environment, there may be multiple access points within communication range of the electronic device. When these access points receive the probe request, all of them may respond by transmitting probe responses. Many of the probe responses may come from access points that are far away from the electronic device, and therefore are less likely to subsequently associate with the electronic device. Moreover, these unnecessary probe responses may degrade the communication performance in one or more wireless networks that are associated with the access points. For example, the multiple probe responses may increase the overhead in the wireless networks (and, thus, may decrease the utilization or the capacity) and may increase the probability of collisions, both of which can degrade the throughput in the wireless networks.

SUMMARY

A described embodiment relates to an access point. This access point includes an interface circuit that wirelessly communicates with an electronic device. During operation, the access point receives, at the interface circuit, a probe request associated with the electronic device. In response, the access point selectively provides, from the interface circuit, a probe response for the electronic device based at least in part on a signal-to-noise ratio (SNR) associated with the probe request and a threshold value.

For example, the probe response may be provided when the SNR is greater than the threshold value. Otherwise, the probe request may be discarded (i.e., the probe response may not be provided).

Moreover, the access point may determine the threshold value based at least in part on one or more other access points that are in proximity to the access point. For example, the one or more other access points may be neighbors of the access point in a wireless environment, such as one or more other access points that are in wireless communication range of the access point.

Furthermore, the access point may determine the threshold value based at least in part on SNRs associated with the one or more other access points.

Additionally, access point may determine the threshold value based at least in part on an estimated wireless coverage provided by the one or more other access points.

In some embodiments, the threshold value increases when a number of the one or more other access points increases, and the threshold value decreases when the number of the one or more other access points decreases.

Note that the access point may determine the threshold value based at least in part on a background scan cycle time.

Moreover, the access point may assign the one or more other access points to classes (which are sometimes referred to as 'tiers'). Then, the access point may calculate a number of the other access points in a given class. Next, the access point may determine the threshold value based at least in part on numbers of the other access points in the classes, a client-adjustment value associated with the electronic device, and a class-adjustment value. Note that the class-adjustment value may be based at least in part on the number of the other access points in at least one of the classes.

Furthermore, when the access point provides the probe response, the access point may store an identifier of the electronic device (such as a media access control or MAC address or an association identity or identifier or AID) and a time when the probe response was provided, e.g., in a look-up table. When the access point subsequently receives a second probe request associated with the electronic device within a time interval of providing the probe response, the access point may discard the second probe request (e.g., the access point may not provide a second probe response).

Another embodiment provides a computer-readable storage medium for use with the access point. This computer-readable storage medium may include program instructions that, when executed by the access, causes the access point to perform at least some of the aforementioned operations.

Another embodiment provides a method. This method includes at least some of the operations performed by the access point.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An access point that selectively provides a probe response is described. During operation, the access point may receive a probe request associated with an electronic device. In response, the access point may selectively provide the probe response based at least in part on a signal-to-noise ratio (SNR) associated with the probe request and a threshold value. For example, the probe response may be provided when the SNR is greater than the threshold value, and otherwise the probe request may be discarded or ignored. Moreover, the access point may dynamically determine the threshold value based at least in part on: one or more other access points that are in wireless communication range of the access point; SNRs associated with the one or more other access points; and/or an estimated wireless coverage provided by the one or more other access points. For example, the threshold value may increase when a number of the one or more other access points increases, and the threshold value may decrease when the number of the one or more other access points decreases.

By selectively providing the probe response, this communication technique reduce or eliminate unnecessary probe responses, such as in crowded wireless environments. Moreover, by reducing the number of probe responses, the communication technique may improve the communication performance in one or more wireless networks that are associated with the access points. For example, the communication technique may reduce the overhead in the wireless networks (and, thus, may increase the utilization or the capacity) and may decrease the probability of collisions. Therefore, the communication technique may increase the throughput in the wireless networks. Consequently, the communication technique may improve the user experience and customer satisfaction of users of the access point(s) and/or the electronic device.

In the discussion that follows, electronic devices or components in a system communicate packets in accordance with a wireless communication protocol, such as: a wireless communication protocol that is compatible with an IEEE 802.11 standard (which is sometimes referred to as WiFi®, from the Wi-Fi Alliance of Austin, Tex.), Bluetooth® (from the Bluetooth Special Interest Group of Kirkland, Wash.), and/or another type of wireless interface (such as another wireless-local-area-network interface). Moreover, an access point in the system may communicate with a controller or services using a wired communication protocol, such as a wired communication protocol that is compatible with an Institute of Electrical and Electronics Engineers (IEEE) 802.3 standard (which is sometimes referred to as 'Ethernet'), e.g., an Ethernet II standard. However, a wide variety of communication protocols may be used in the system, including wired and/or wireless communication. In the discussion that follows, Ethernet and Wi-Fi are used as illustrative examples.

Figure 1:
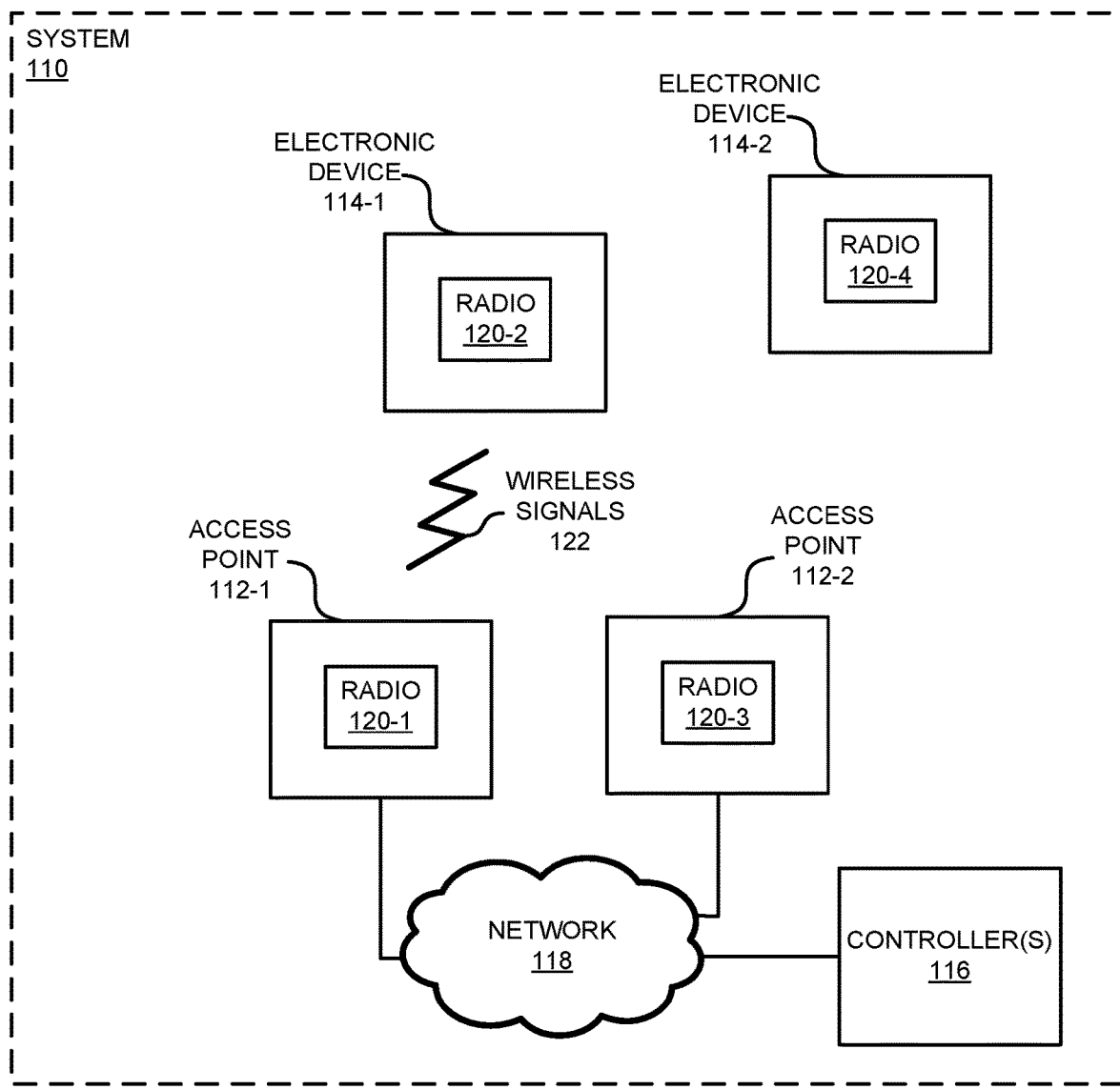
FIG. 1 is a block diagram illustrating an example of a system in accordance with an embodiment of the present disclosure.

We now describe some embodiments of the communication technique. FIG. 1 presents a block diagram illustrating an example of a system 110, which may include components, such as: one or more access points 112, one or more electronic devices 114 (such as cellular telephones, stations, another type of electronic device, etc.), and one or more optional controllers 116. In system 110, the one or more access points 112 may wirelessly communicate with the one or more electronic devices 114 using wireless communication that is compatible with an IEEE 802.11 standard. Thus, the wireless communication may occur in a 2.4 GHz, a 5 GHz and/or a 60 GHz frequency band. (Note that IEEE 802.11ad communication over a 60 GHz frequency band is sometimes referred to as 'WiGig.' In the present discussion, these embodiments also encompassed by 'Wi-Fi.') However, a wide variety of frequency bands may be used. Moreover, the one or more access points 112 may communicate with the one or more optional controllers 116 via network 118 (such as the Internet, an intra-net and/or one or more dedicated links). Note that the one or more optional controllers 116 may be at the same location as the other components in system 110 or may be located remotely (i.e., at a different location). Moreover, note that the one or more access points 112 may be managed by the one or more optional controllers 116. Furthermore, note that the one or more access points 112 may provide access to network 118 (e.g., via an Ethernet protocol), and may be a physical access point or a virtual or 'software' access point that is implemented on a computer or an electronic device. While not shown in FIG. 1, there may be additional components or electronic devices, such as a router.

Additionally, as noted previously, the one or more access points 112 and the one or more electronic devices 114 may communicate via wireless communication. In particular, one or more of access points 112 and one or more of electronic devices 114 may wirelessly communicate while: transmitting advertising frames on wireless channels, detecting one another by scanning wireless channels, exchanging subsequent data/management frames (such as association requests and responses) to establish a connection, configure security options (e.g., Internet Protocol Security), transmit and receive frames or packets via the connection (which may include the association requests and/or additional information as payloads), etc.

Figure 7:
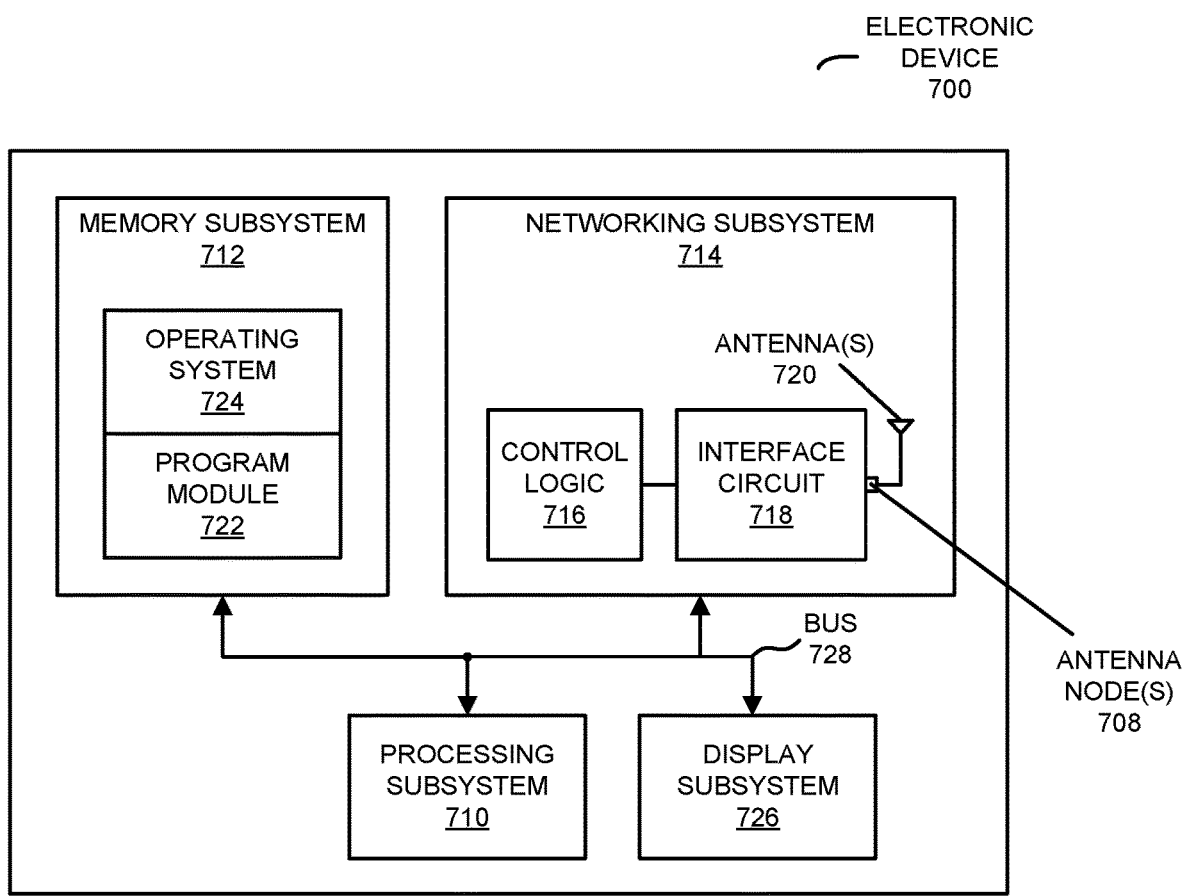
FIG. 7 is a block diagram illustrating an example of an electronic device in accordance with an embodiment of the present disclosure.

As described further below with reference to FIG. 7, the one or more access points 112, the one or more electronic devices 114 and/or the one or more optional controls 116 may include subsystems, such as a networking subsystem, a memory subsystem and a processor subsystem. In addition, the one or more access points 112 and the one or more electronic devices 114 may include radios 120 in the networking subsystems. More generally, the one or more access points 112 and the one or more electronic devices 114 can include (or can be included within) any electronic devices with the networking subsystems that enable the one or more access points 112 and the one or more electronic devices 114 to wirelessly communicate with each other.

As can be seen in FIG. 1, wireless signals 122 (represented by a jagged line) are transmitted from a radio 120-1 in electronic device 114-1. These wireless signals are received by radio 120-2 in at least one of the one or more access points 112, such as access point 112-1. In particular, electronic device 114-1 may transmit frames or packets. In turn, these frames or packets may be received by access point 112-1. This may allow electronic device 114-1 to communicate information to access point 112-1. Note that the communication between electronic device 114-1 and access point 112-1 may be characterized by a variety of performance metrics, such as: a data rate, a data rate for successful communication (which is sometimes referred to as a 'throughput'), an error rate (such as a retry or resend rate), a mean-square error of equalized signals relative to an equalization target, intersymbol interference, multipath interference, an SNR, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 120 are shown in the one or more electronic devices 114 and the one or more access points 112, one or more of these instances may be different from the other instances of radios 120.

As noted previously, electronic devices 114 may regularly transmit multiple probe requests. If access points 112 respond by transmitting probe responses to each of the probe requests, significant overhead may occur in the wireless network in system 110 which may adversely impact the communication performance (such as the throughput and/or the capacity).

In order to address these challenges, the one or more access points 112 may implement or use the communication technique. In particular, as discussed further below with reference to FIGS. 2 and 3, during the communication technique a given one of the one or more access points 112 (such as access point 112-1) may communicate with one or more other access points 112. For example, access point 112-1 may receive packets or frames that are associated with the one or more other access points 112, such as packets or frames that are transmitted by or from the one or more other access points 112. As described further below, based at least in part on a number of the one or more other access points 112 and/or SNRs associated with the one or more other access points 112 (such as SNRs that are determined by access point 112-1 when the packets or frames from the other one or more access points 112 are received), access point 112-1 may determine a threshold value.

Subsequently, when access point 112-1 receives a probe request associated with one of electronic devices 114 (such as electronic device 114-1), e.g., a probe request that is transmitted by or from electronic device 114-1, access point 112-1 may selectively provide a probe response. Notably, in response to the probe request, access point 112-1 may selectively provide the probe response based at least in part on an SNR associated with the probe request (such as the SNR determined by access point 112-1 when the probe request was received) and the threshold value. For example, access point 112-1 may provide the probe response when the SNR is greater than the threshold value. Otherwise, the probe request may be discarded or dropped (i.e., the probe response may not be provided).

As discussed further below with reference to FIGS. 5 and 6, access point 112-1 may dynamically determine the threshold value. For example, access point 112-1 may determine the threshold value based at least in part on the one or more other access points 112 that are in proximity to access point 112-1. Notably, the one or more other access points 112 may be neighbors of access point 112-1 in a wireless environment, such as one or more other access points 112 that are in wireless communication range of access point 112-1. Alternatively or additionally, access point 112-1 may determine the threshold value based at least in part on: SNRs associated with the one or more other access points 112; and/or an estimated wireless coverage provided by the one or more other access points 112. In some embodiments, the threshold value increases when a number of the one or more other access points 112 increases, and the threshold value decreases when the number of the one or more other access points 112 decreases.

In some embodiments, access point 112-1 may assign the one or more other access points 112 to classes (which are sometimes referred to as 'tiers'). Then, access point 112-1 may calculate a number of the one or more other access points 112 in a given class. Next, access point 112-1 may determine the threshold value based at least in part on numbers of the one or more access points 112 in the classes, a client-adjustment value associated with electronic device 114-1, and a class-adjustment value. Note that the class-adjustment value may be based at least in part on the number of the one or more other access points 112 in at least one of the classes.

When access point 112-1 provides the probe response, access point 112-1 may store an identifier of electronic device 114-1 (such as a MAC address or an AID) and a time when the probe response was provided, e.g., in a look-up table in a computer-readable memory. When access point 112-1 subsequently receives a second probe request associated with electronic device 114-1 within a time interval of providing the probe response (e.g., a time interval between 0.5 and 10 s), access point 112-1 may discard the second probe request (e.g., access point 112-1 may not provide a second probe response). For example, when access point 112-1 receives the second probe request, access point may access the look-up table based at least in part on a MAC address or an AID in the second probe request to determine an elapsed time since providing the probe response and, thus, whether to provide the second probe response.

Note that access point 112-1 may determine the threshold value based at least in part on a background scan cycle time. For example, access point 112-1 may determine the threshold value after a scan. More generally, access point 112-1 may determine the threshold value: once, periodically (such as after a scan) or as needed (such as based at least in part on communication performance).

In this way, the communication technique may reduce overhead in the wireless network, and thus may improve the communication performance. For example, using the communication technique, the number of probe responses may be reduced by 10-15%.

In the described embodiments, processing a frame or a packet in access points 112 may include: receiving wireless signals 122 with the frame or packet; decoding/extracting the frame or packet from the received wireless signals 122 to acquire the frame or packet; and processing the frame or packet to determine information contained in the frame or packet.

Although we describe the network environment shown in FIG. 1 as an example, in alternative embodiments, different numbers or types of electronic devices or components may be present. For example, some embodiments comprise more or fewer electronic devices or components. Therefore, in some embodiments there may be fewer or additional instances of at least some of the one or more access points 112, the one or more electronic devices 114 and/or the one or more optional controllers 116. As another example, in another embodiment, different electronic devices are transmitting and/or receiving frames or packets.

Figure 2:
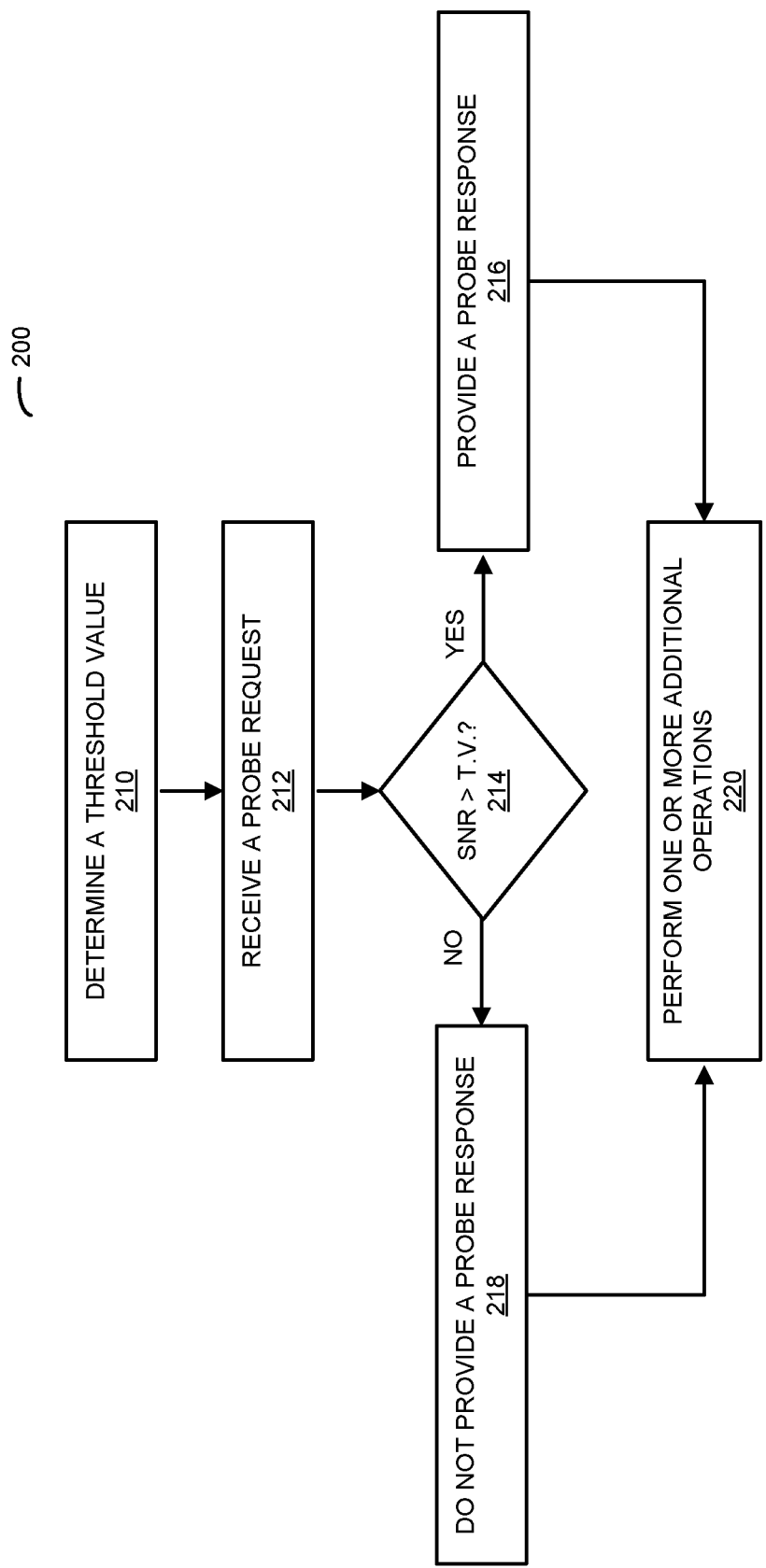
FIG. 2 is a flow diagram illustrating an example of a method for selectively providing a probe response in the system in FIG. 1 in accordance with an embodiment of the present disclosure.

We now describe embodiments of the method. FIG. 2 presents an example of a flow diagram illustrating a method 200 for selectively providing a probe response. Moreover, method 200 may be performed by an electronic device, such as one of the one or more access points 112 in FIG. 1, e.g., access point 112-1.

During operation, an access point may receive a probe request (operation 212) associated with an electronic device. In response, the access point may selectively provide a probe response for the electronic device (operation 216) based at least in part on an SNR associated with the probe request and a threshold value. For example, the probe response may be provided (operation 216) when the SNR is greater than the threshold value or T.V. (operation 214). Otherwise, the probe request may be discarded, i.e., the probe response may not be provided (operation 218).

Moreover, the access point may determine the threshold value (operation 210) based at least in part on one or more other access points that are in proximity to the access point. For example, the one or more other access points may be neighbors of the access point in a wireless environment, such as one or more other access points that are in wireless communication range of the access point. Alternatively or additionally, the access point may determine the threshold value based at least in part on: SNRs associated with the one or more other access points; and/or an estimated wireless coverage provided by the one or more other access points. In general, the threshold value may increase when a number of the one or more other access points increases, and the threshold value may decrease when the number of the one or more other access points decreases. Note that the access point may determine the threshold value based at least in part on a background scan cycle time. Thus, the access point may dynamically determine the threshold value.

In some embodiments, the access point may determine the threshold value (operation 210) by performing one or more operations. Notably, the access point may assign the one or more other access points to classes or tiers. Then, the access point may calculate a number of the other access points in a given class. Next, the access point may determine the threshold value based at least in part on numbers of the other access points in the classes, a client-adjustment value associated with the electronic device (which may, at least partially, correct for differences between the transmit power of the other access points and the electronic device), and a class-adjustment value (which may define how aggressive the access point is in providing the probe response). Note that the class-adjustment value may be based at least in part on the number of the other access points in at least one of the classes.

In some embodiments, the access point optionally performs one or more additional operations (operation 220). For example, when the access point provides the probe response (operation 216), the access point may store an identifier of the electronic device (such as a MAC address or an AID) and a time when the probe response was provided, e.g., in a look-up table. When the access point subsequently receives a second probe request associated with the electronic device within a time interval of providing the probe response, the access point may discard the second probe request (e.g., the access point may not provide a second probe response).

In some embodiments of method 200, there may be additional or fewer operations. Moreover, the order of the operations may be changed, and/or two or more operations may be combined into a single operation.

While the preceding discussion illustrated the use of SNR in the communication technique, in other embodiments one or more different performance metrics may be used, such as: a signal strength (e.g., a received signal strength indicator or RSSI), a data rate, a throughput, an error rate (such as a retry or resend rate), a mean-square error of equalized signals relative to an equalization target, intersymbol interference, multipath interference, a width of an eye pattern, capacity of a communication channel or link), utilization, etc. Moreover, while the preceding discussion illustrated the access point determining the threshold value individually, in other embodiments two or more access points may exchange information (such as their locations, transmit powers, threshold values, etc.) and the access point may determine the threshold value based at least in part on the exchanged information associated with one or more other access points. Consequently, in some embodiments, threshold values are determined by two or more access points as a group.

Moreover, while the preceding discussion illustrated an access point automatically and dynamically determining the threshold value, in other embodiments the threshold value for the access point may be defined or specified, such as by a network administrator. Thus, in these embodiments, the access point may receive information that specifies or defines the threshold value, instead of the access point dynamically determining the threshold value.

Figure 3:
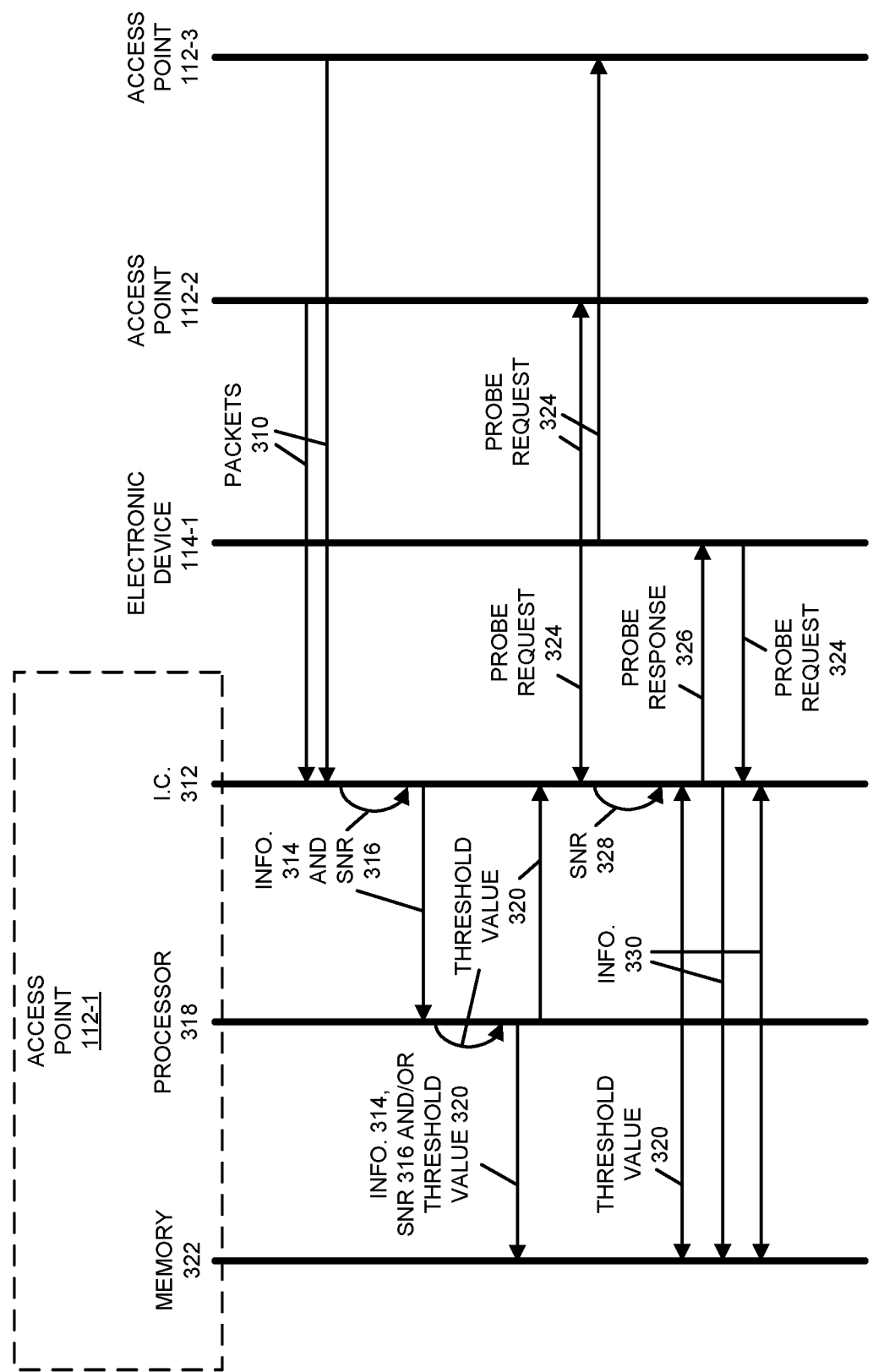
FIG. 3 is a drawing illustrating an example of communication among the electronic devices in FIG. 1 in accordance with an embodiment of the present disclosure.

FIG. 3 presents a drawing illustrating an example of communication among access points 112 and electronic device 114-1. In FIG. 3, interface circuits (I.C.) in access points 112-2 and 112-3 may transmit and packets 310 or frames. Interface circuit 312 in access point 112-1 may receive packets 310 or frames. Information 314 included in packets 310 or frames may identify access points 112-2 and 112-3, such as basic service set identifiers (BSSIDs). In addition, interface circuit 312 may determine SNRs 316 of packets 310 or frames when packets 310 or frames are received. Then, interface circuit 312 may provide information 314 and information specifying SNRs 316 to processor 318, which may be separate from or included in interface circuit 312. Next, processor 318 may use information 314 and/or the information specifying SNRs 316 to determine threshold value 320. Moreover, processor 318 may store information 314, the information specifying SNRs 316 and/or threshold value 320 in memory 322. Alternatively or additionally, processor 318 may provide threshold value 320 to interface circuit 312.

Subsequently, an interface circuit in electronic device 114-1 may provide probe request 324 to access points 112. When interface circuit 312 receives probe request 324, interface circuit 312 may selectively provide probe response 326. Notably, interface circuit 312 may determine SNR 328 of probe request 324 when interface circuit 312 receives probe request 324. Then, interface circuit 312 may compare SNR 328 with threshold value 320. This may involve accessing information specifying threshold value 320 in memory 322. Alternatively, as noted previously, threshold value 320 may have been previously provided to interface circuit 312. Note that communication among the components in access point 112-1 may be unidirectional or bidirectional.

When SNR 328 is greater than threshold value 320, interface circuit 312 may provide probe response 326. Alternatively, when SNR 328 is less than threshold value 320, interface circuit 312 may not provide prove response 326. (Note that when SNR 328 equals threshold value 320, interface circuit 312 may provide probe response 326 or, in other embodiments, may not provide probe response 326.)

Moreover, when interface circuit 312 provides probe response 326 to electronic device 114-1, interface circuit 312 may store associated information 330 in memory 322, such as an identifier of electronic device 114-1 (such as a service set identifier or SSID, or a MAC address of electronic device 114-1, or an AID of or associated with electronic device 114-1) and a timestamp when probe response 326 was provided. As described further below with reference to FIG. 4, information 330 may be stored in a data structure, such as a look-up table.

Instances of the operations performed by access point 112-1 may also be performed by access points 112-2 and 112-3. Consequently, access points 112-2 and/or 112-3 may selectively provide additional probe responses in response to receiving probe request 324. Note that probe request 324 may be concurrently transmitted to access points 112 by electronic device 114-1. Nonetheless, probe request 324 to access point 112-2 and 112-3 are shown offset in FIG. 3 for clarity.

In some embodiments, the interface circuit in electronic device may subsequently provide probe request 332. When interface circuit 312 receives probe request 332, interface circuit 312 may access information 330 in memory 322. For example, interface circuit 312 may look up the timestamp when probe response 326 was provided based at least in part on an identifier of electronic device 114-1 that is included in probe request 332. When an elapsed time is less a time interval (such as a time interval between 0.5 and 10 s) and the probe response 326 was successful (such as when an acknowledgement was received from electronic device 114-1), interface circuit 312 may not provide a probe response to electronic device 114-1 in response to probe request 332.

Figure 4:
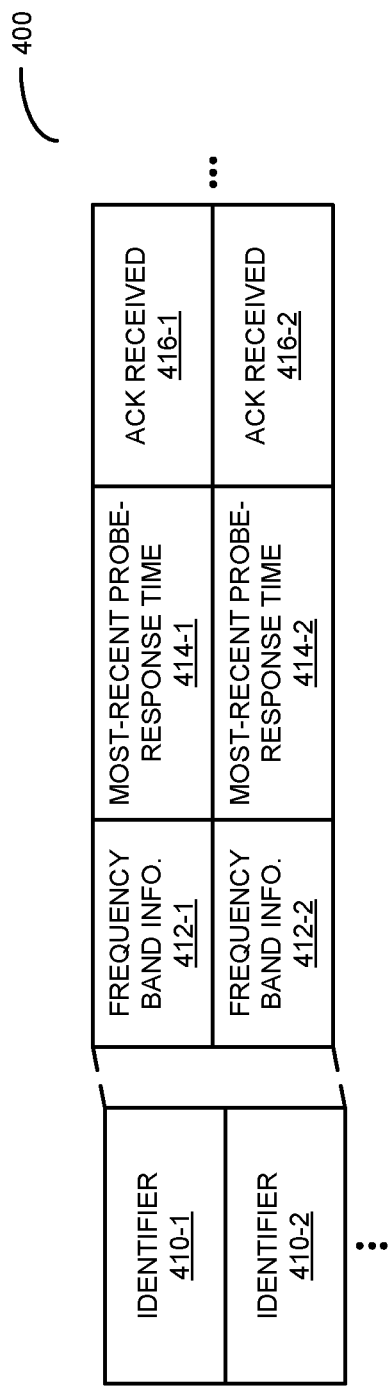
FIG. 4 is a drawing of an example of a data structure that is used by an access point in the system in FIG. 1 in accordance with an embodiment of the present disclosure.

FIG. 4 presents a drawing of an example of a data structure 400 (such as a probe-response history) that is used by an access point, such as one of the one or more access points 112 in FIG. 1, e.g., access point 112-1. Data structure 400 may include: identifiers 410 (such as MAC addresses or AIDs), frequency-band information 412 (such as, e.g., 2.4 or 5 GHz), last or most-recent probe-response times 414, and/or whether an acknowledgment was received 416 (which may indicate whether a probe response was successful). However, data structure 400 may include more or fewer fields or entries. Moreover, fields or entries may be combined into a single field or entry, a single field or entry may be separated into two or more fields or entries, and/or positions of the fields or entries may be changed.

In some embodiments, the communication technique facilitates probe-response suppression based at least in part on SNR associated with access points within wireless communication range of an access point. Wi-Fi devices often use channel-scanning techniques to scan the nearby operating access points. In particular, unless restricted by regulators, a Wi-Fi client device (such as one of electronic devices 114 in FIG. 1) may use probe requests based on an active-scanning technique to quickly scan the nearby access points. A dual-band Wi-Fi client device may go through each channel one by one, and may perform the scan by sending a burst of probe requests and listening for probe responses. The Wi-Fi client device may perform this on each and every channel one by one on both the 2.4 and 5 GHz frequency bands. This approach is intended to allow the Wi-Fi client device to try to 'hear' the neighboring access points in a wireless or radio-frequency vicinity. Then, based at least in part on the signal strengths of the neighboring access points, a Wi-Fi client device may decide to join or associate with a particular access point with good signal strength.

While the aforementioned approach helps Wi-Fi client devices to identify neighboring access points, the resulting probe responses from the access points can create a lot of management traffic over the air, which may reduce the communication performance of the wireless networks. Notably, the access points that receive the probe requests typically respond with probe responses. Consequently, as more probe requests are sent by Wi-Fi client devices, more probe responses are sent by the access points.

For example, in an office environment a smartphone may come into wireless range and may try to associate with an access point. As discussed previously, the smartphone may scan multiple channels by sending probe requests. The neighboring access points may receive the probe requests and may respond with the probe responses irrespective of the SNR or RSSI levels. Consequently, in this example, the neighboring access points may respond to the probe requests by sending probe responses, so that the smartphone can 'hear' them and potentially join the wireless network associated with the access point with better signal strength. Nonetheless, this approach results in numerous probe-response frames being transmitted over the air, which can congest the wireless network and reduce the bandwidth.

After the smartphone has finished scanning the channels, it may prepare a table of the neighboring access points, and it may select to join or associate with one of the access points based at least in part on its RSSI and/or other parameters. A Wi-Fi client device like the smartphone will try to join an access point that has strong signals relative to the other access points. Typically, this access point is one of the access points that is nearest to the Wi-Fi client device (unless there is another reason for the Wi-Fi client device to join an access point that is farther away). Consequently, the probe responses from access points that are further away are usually unnecessary, because the Wi-Fi client device is not likely to join any of them when it can receive probe responses from other nearby (and, thus, better) access points.

This problem is compounded in crowded wireless environments. For example, in a stadium, where access points may be deployed 25-30 meters apart, there are many Wi-Fi client devices that each perform scans by sending probe requests. Consequently, the wireless environment may be very noisy. Indeed, 70-80% of airtime utilization may be associated with management frames, which may adversely impact the overall communication performance of the access points, such as the throughput, and the user experience.

The communication technique may address this problem by reducing the number of probe responses transmitted by an access point while maintaining the same level of client service and connectivity. This approach may not adversely impact service, because at least one access point that is near to or proximate to a Wi-Fi client device may response to a probe request from the Wi-Fi client device.

In the communication technique, an access point may determine a threshold value for a probe response. For example, the threshold value of the access point may be set to a particular SNR level (in dB). If the access point receives a probe request from a Wi-Fi client device with an SNR that is less than the threshold value, the access point may discard the probe request and may not send a probe response.

Ideally, the threshold values determined by the access points in the preceding example would be set or determined in such a way that, when the smartphone send the probe request, only nearby access points will respond with probe responses and the remaining access points may discard the probe request because it is coming from a smartphone that is too far away to be serviced.

However, when determining their threshold values, the access points need to make sure there are potentially other access points that are closer to the Wi-Fi client device and, therefore, are more likely to be able to serve the Wi-Fi client device. In this way, the threshold value in the communication technique may be dynamically determined or adapted to help ensure that the Wi-Fi client device does not go unserved by the access points.

As described below, the communication technique may be implemented on each of the access points, so that the access points can appropriately determine their threshold values based at least in part on run-time monitoring of the other access points in their wireless environment. The access points may periodically (such as every few seconds) determine their threshold values and may use the threshold values to determine which probe requests to discard, such as probe requests from Wi-Fi client devices that are far away or that can potentially be better served by access points that closer to the Wi-Fi client devices. For example, a probe request that has an SNR of 14 or 24 dB may result in a probe response from an access point, while a probe request that has an SNR of 8 dB may be suppressed. Note that a given access point can dynamically update the threshold values at runtime, so the access point can adapt to changes in the wireless environment (such as interference, a number of Wi-Fi client devices, access points moving to different channels that have different transmit characteristics, access points turning on or off, etc.).

In some embodiments, an access point may monitor neighboring access points and their SNRs, and may store this information in a table. The access points may be divided into different class of tiers, such as tier 1, tier 2 or tier 3 access points. The classification of the access points into the tiers may be based at least in part on their SNRs, which may approximately group access points based at least in part on their relative distances. After assigning the access points to the different tiers, the access point may count the number of access points in each of the tiers. The counts in the different tiers may be used to estimate wireless coverage by the access points. As described further below, the access point may determine the threshold value based at least in part on the estimated wireless coverage.

When a background scan is enabled on an access point, the access point may periodically go to a different channel (e.g., for approximately 30-50 ms) to perform a channel scan in the 2.4G and/or the 5G bands. Based at least in part on the scan results collected by access point on the channels, the access point may prepare a neighbor table with the information for the neighboring access points. Table 1 provides an example of a neighboring table.

TABLE 1

| Access Point | Channel in 2.4G | SNR in 2.4G (dB) | Channel in 5G | SNR in 5G (dB) |
| --- | --- | --- | --- | --- |
| AP1 | 1 | 10 | 124 | 31 |
| AP2 | 10 | 35 | 108 | 34 |
| AP3 | 6 | 45 | 153 | 21 |
| AP4 | 11 | 25 | 132 | 17 |
| AP5 | 6 | 23 | 100 | 31 |
| AP6 | 1 | 15 | 116 | 29 |
| AP7 | 11 | 40 | 108 | 14 |

Then, the access point may assign the access points into the tiers. For example, in the 5G band the maximum SNR in tier 1 is 34 dB. The maximum SNR in tier 2 may be 5-15 dB smaller, e.g., 24 dB. Moreover, the maximum SNR in tier 3 may be 10-20 dB smaller, e.g., 9 dB. Consequently, in this example, AP1, AP2, AP5 and AP6 may be assigned to tier 1, AP3, AP4 and AP7 may be assigned to tier 2, and there may not be any access points assigned to tier 3. Therefore, the counts of the numbers of access points in the tiers may be four in tier 1, three in tier 2 and zero in tier 3.

Next, the access point may use this information to determine a current threshold value. Notably, the threshold value may be the maximum SNR in one of the tiers (such as tier 2) minus a client-adjustment value (in dB) and minus a tier or class-adjustment value (in dB). For example, the threshold value may be the maximum SNR in tier 2 (24 dB) minus a client-adjustment value (such as 10 dB) minus a tier or class-adjustment value (such as 6 dB). Consequently, in the preceding example, the threshold value may be 24 dB-10 dB-6 dB or 8 dB. More generally, the threshold value may be between 0 and 30 dB. The lower bound may result in no probe requests being discarded (such as when there are no neighboring access points or the neighboring access points are very far away), and the upper bound may correspond to a SNR at which a Wi-Fi client device can associated with and maintain a stable connection with the access point.

The client-adjustment value may be used to correct for differences in the transmit power and range of access points and Wi-Fi client devices. Notably, access points may be mounted on the ceiling, and therefore may have larger ranges and less multipath signals than the Wi-Fi client devices. Consequently, the SNR of a nearby or proximate access point may be larger than the SNR of a nearby or proximate Wi-Fi client device (e.g., 5-6 dB larger). Moreover, access points typically use larger transmit powers than the Wi-Fi client devices, and there may be differences in the Wi-Fi client devices from different manufacturers (such as different radio-frequency and/or antenna capabilities). The client-adjustment value may correct, at least in part, for these differences between access points and the Wi-Fi client devices. In some embodiments, the client-adjustment value is between 5 and 20 dB.

Note that the tier or class-adjustment value may specify the aggressiveness of the threshold value in suppressing probe responses. The tier or class-adjustment value may be based at least in part on the count or the number of access points in at least one of the tiers. For example, the tier or class-adjustment value may be based at least in part on the count or number of access points in tier 1 and/or the count or number of access points in tier 2. Moreover, if the count or the number of access points in tier 1 is zero, the tier or class-adjustment value may be 0 dB.

Figure 5:
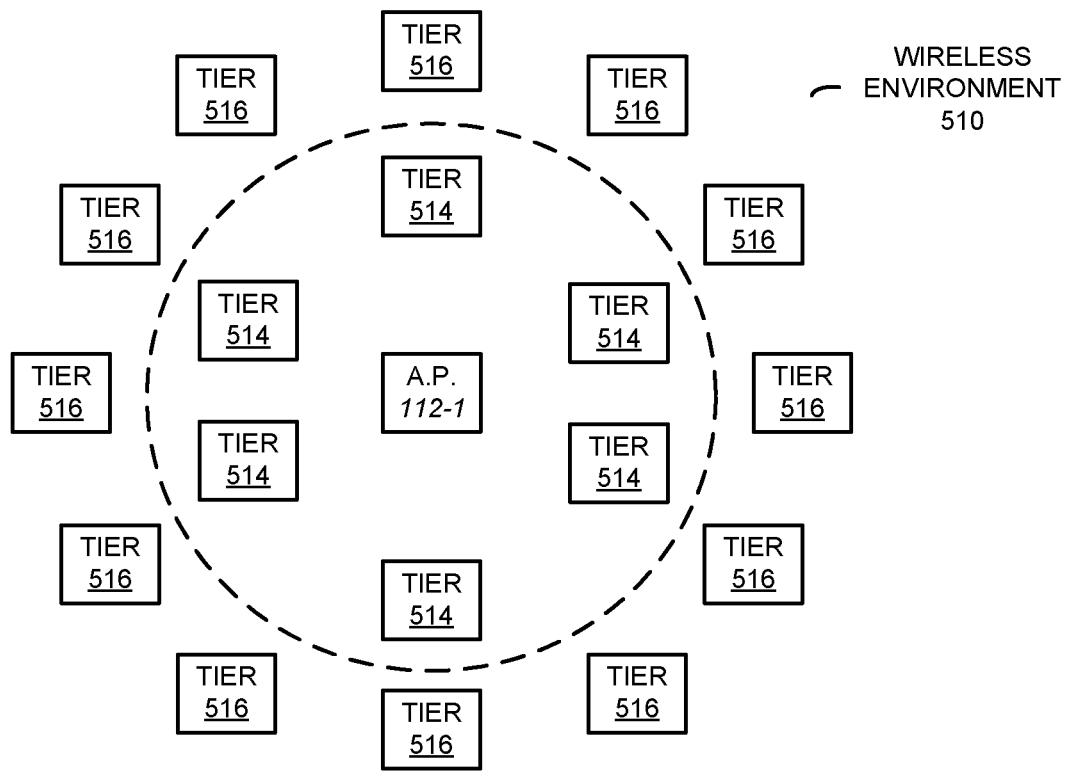
FIG. 5 is a drawing illustrating examples of wireless environments in accordance with an embodiment of the present disclosure.
Figure 5:
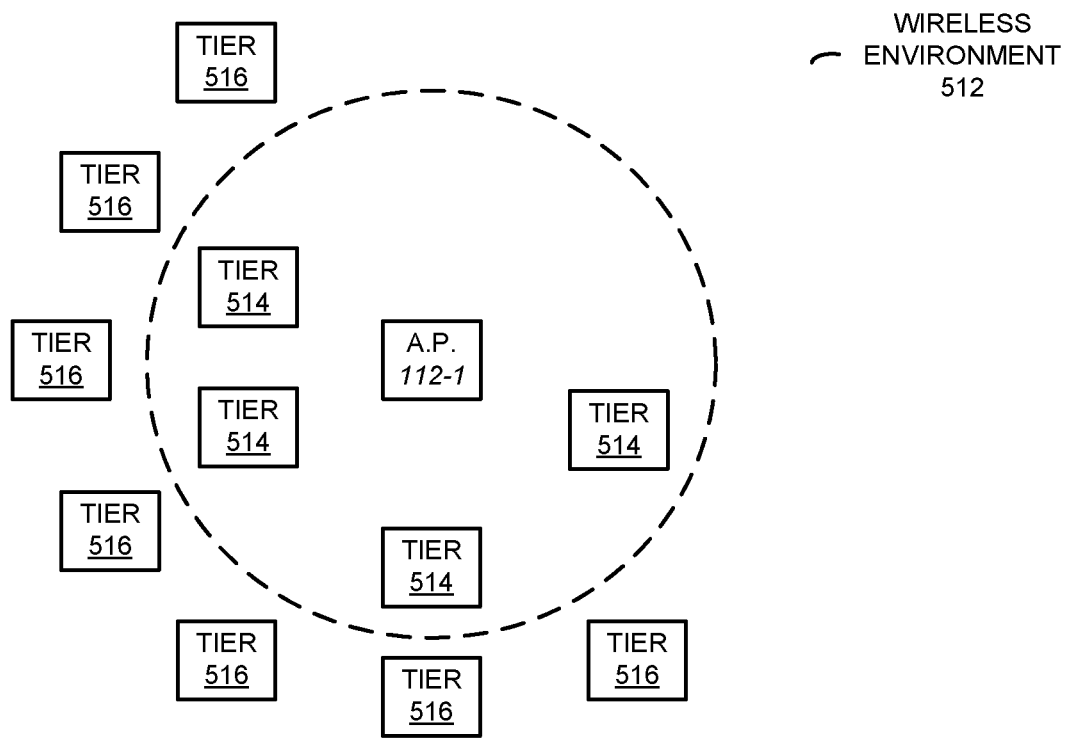

FIG. 5 provides a drawing illustrating wireless environments 510 and 512. Wireless environment 510 has more neighboring access points to access point (A.P.) 112-1 with uniform coverage in tiers 514 and 516. Consequently, the estimated wireless coverage may not have a hole, and the resulting threshold value may be higher.

In contrast, wireless environment 512 has fewer neighboring access points to access point 112-1 with non-uniform coverage in tiers 514 and 516. Consequently, the estimated wireless coverage may have a hole, and the resulting threshold value may be lower, which results in fewer discard probe requests. However, if the access point is at an edge or boundary of a desired coverage area (such as near an edge of a building), then the spatial distribution of neighboring access points may be similar to that in wireless environment 512. Even though the estimated wireless coverage may have a hole, the threshold value in this example may not be reduced as much as it would be if the access point were located in the middle of the building or desired coverage area.

Figure 6:
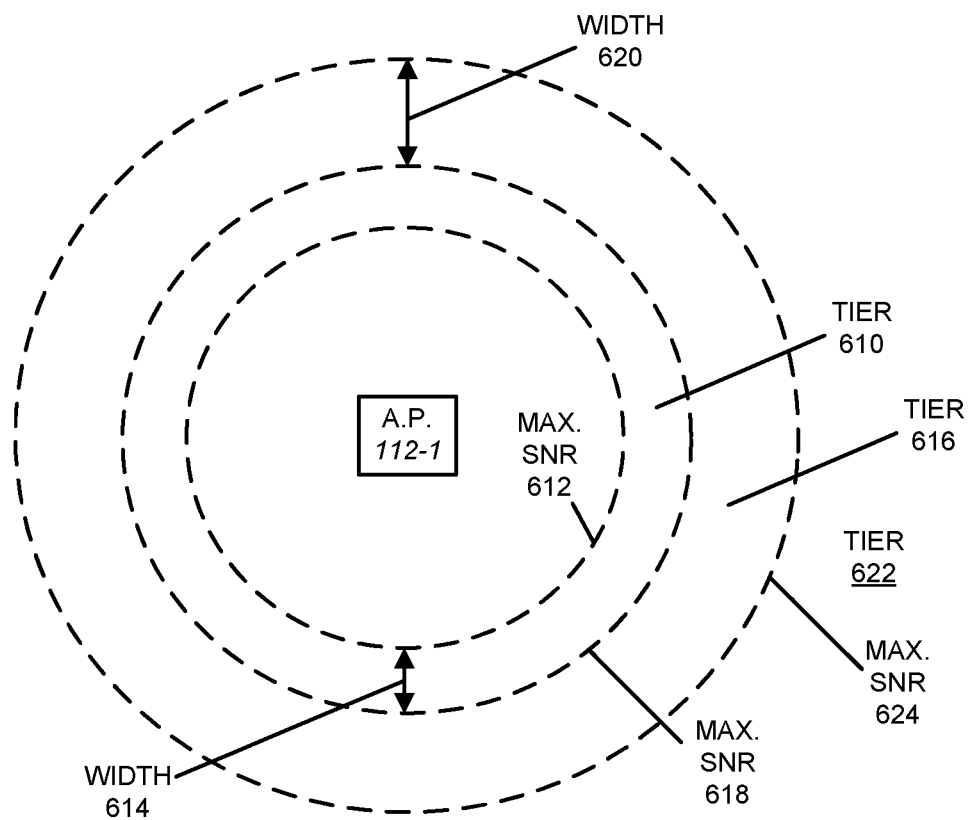
FIG. 6 is a drawing illustrating an example of the assignment of access points to classes or tiers in accordance with an embodiment of the present disclosure.

FIG. 6 provides a drawing illustrating an example of the assignment of access points to classes or tiers 610, 616 and 622. Notably, tier 610 may have a maximum SNR (Max. SNR) 612 and a width 614, tier 616 may have a maximum SNR 618 and a width 620, and tier 622 may have a maximum SNR 624.

For example, maximum SNR 612 may be 45 dB and width 614 may be 10 dB, maximum SNR 618 may be 35 dB and width 620 be 15 dB, and maximum SNR 624 may be 20 dB. If the count or number of access points in tier 610 is two and the count or number of access points in tier 616 is three, the class or tier-adjustment value may be 12 dB. Consequently, the threshold value may be maximum SNR 618 minus the client-adjustment value minus the class or tier-adjustment value, or 35 dB-10 dB-12 db or 13 dB.

After determining the threshold value, the access point may use it to selectively suppress probe responses. Notably, when the access point receives a probe request from or associated with a new Wi-Fi client device, the access point may compare the SNR of the probe request with the threshold value. If the SNR is less than the threshold value, the access point may discard the probe request and may not send a probe response. For example, if the threshold value is 20 dB, and the SNR of an incoming probe request is less than 20 dB, the access point may discard the probe request and may not send a probe response. Alternatively, if the SNR of an incoming probe request is greater than 20 dB, the access point may provide a probe response.

In some embodiments, the access point uses the tiers or classes determined based at least in part on the neighboring table to estimate the wireless coverage of the neighboring access points. For example, the access point may use the tiers to determine the threshold value based at least in part on whether there are any holes in the estimated wireless coverage of the neighboring access points around the access point.

Typically, when a Wi-Fi network is deployed, a network administrator(s) may try to ensure that there is 360° wireless coverage available across the venue except at the corners or edges of the building(s). In the communication technique, the access point may use the count or the number of access points assigned to tier 1, tier 2 and tier 3, respectively, to determine whether there is a hole in the estimated wireless coverage around the access point. For example, if there are at least six access points in tier 1 and/or at least twelve access points in tier 2, the access point may estimate that the wireless coverage in the surrounding wireless environment does not have any holes, i.e., that it has 360° estimated wireless coverage. Alternatively, each reduction in the count or the number of access points in tier 1 or tier 2 of 18.3% may correspond to a hole of 60° in the estimated wireless coverage. As the size of the hole or the reduction in the estimated wireless coverage increases, the threshold value may be reduced (so that fewer probe responses are suppressed). When the size of the hole is estimated by be 360° (such as when the count of the number of access points in tier 1 or tier 2 is zero), the threshold value may be set to zero (i.e., the suppression of probe responses may be disabled).

The communication technique may be run on multiple access points in a wireless environment. For example, the communication technique may run periodically on an access point at the runtime, such as after the access point performs a periodic background scan to listen for neighboring access points operating in within wireless range of the access point.

Notably, after the access point completes the background scan cycle on the available channels, the access point may have the information about its neighboring access points that it needs to determine a current threshold value. Note that the periodicity of the determination of the threshold value may be each to the total background scan cycle time, which may equal the number of channels to scan times the scan interval between two scans. In some embodiments, the periodicity of the determination of the threshold value is the total background scan cycle time rounded to the nearest minute.

In some embodiments, the communication technique may reduce the airtime utilization in a wireless network by up to 10%. Moreover, the communication technique may provide an overall SNR improvement of approximately 6-8 dB for Wi-Fi client devices when the associate with the access point.

We now describe embodiments of an electronic device, which may perform at least some of the operations in the communication technique. For example, the electronic device may include a component in system 110, such as one of: the one or more access points 112, the one or more electronic devices 114 and/or the one or more optional controllers 116. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, graphical processor units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory (which collectively or individually are sometimes referred to as a 'computer-readable storage medium'). In some embodiments, instructions for processing subsystem 710 in memory subsystem 712 include: program instructions or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a pad, which can be coupled to the one or more antennas 720. Thus, electronic device 700 may or may not include the one or more antennas 720.) For example, networking subsystem 714 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a computer, a mainframe computer, a cloud-based computer, a tablet computer, a smartphone, a cellular telephone, a smartwatch, a consumer-electronic device, a portable computing device, an access point, a transceiver, a controller, a radio node, a router, a switch, communication equipment, a wireless dongle, an access point, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program instructions 722, operating system 724 (such as a driver for interface circuit 718) or in firmware in interface circuit 718. Alternatively or additionally, at least some of the operations in the communication technique may be implemented in a physical layer, such as hardware in interface circuit 718.

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An access point, comprising:
an antenna node configured to couple to an antenna; and
an interface circuit, coupled to the antenna node, configured to wirelessly communicate with an electronic device, wherein the access point is configured to:
receive, at the interface circuit, a probe request associated with the electronic device; and
in response to receiving the probe request, selectively provide, from the interface circuit, a probe response for the electronic device based at least in part on a signal-to-noise ratio (SNR) associated with the probe request and a threshold value, wherein the threshold value corresponds to a non-uniformity of wireless coverage by one or more access points that are in wireless communication range of the access point based at least in part on a spatial arrangement of the one or more access points; and
wherein the non-uniformity of wireless coverage is based at least in part on locations of the one or more access points and comprises an absence of wireless coverage in a region.

2. The access point of claim 1, wherein the probe response is provided when the SNR is greater than the threshold value, and the probe response is not provided when the SNR is less than the threshold value.

3. The access point of claim 1, wherein the access point is configured to determine the threshold value based at least in part on the one or more other access points that are in wireless communication range of the access point.

4. The access point of claim 3, wherein the access point is configured to determine the threshold value based at least in part on SNRs associated with the one or more other access points.

5. The access point of claim 3, wherein the access point is configured to determine the threshold value based at least in part on an estimated wireless coverage provided by the one or more other access points.

6. The access point of claim 3, wherein the threshold value increases when a number of the one or more other access points increases, and the threshold value decreases when the number of the one or more other access points decreases.

7. The access point of claim 3, wherein, when determining the threshold value, the access point is configured to:
assign the one or more other access points to classes; and
calculate numbers of the other access points in the classes; and
wherein the access point is configured to determine the threshold value based at least in part on the numbers of the other access points in the classes, a client-adjustment value associated with the electronic device, and a class-adjustment value.

8. The access point of claim 7, wherein the class-adjustment value is based at least in part on a number of the other access points in at least one of the classes.

9. The access point of claim 1, wherein the access point is configured to determine the threshold value based at least in part on a background scan cycle time; and
wherein the background scan cycle time corresponds to a number of channels to scan and a scan interval between two scans.

10. The access point of claim 1, wherein, after providing the probe response, the access point is configured to store an identifier of the electronic device and a time when the probe response was provided; and wherein, when the access point subsequently receives a second probe request associated with the electronic device within a time interval of providing the probe response, the access point is configured to not provide a second probe response.

11. A non-transitory computer-readable storage medium for use in conjunction with an access point, the computer-readable storage medium storing program instructions that, when executed by the access point, causes the access point to selectively provide a probe response by performing one or more operations comprising:

receiving, at an interface circuit in the access point, a probe request associated with an electronic device; and in response to receiving the probe request, selectively providing, from the interface circuit, the probe response for the electronic device based at least in part on a signal-to-noise ratio (SNR) associated with the probe request and a threshold value, wherein the threshold value corresponds to a non-uniformity of wireless coverage by one or more access points that are in wireless communication range of the access point based at least in part on a spatial arrangement of the one or more access points; and wherein the non-uniformity of wireless coverage is based at least in part on locations of the one or more access points and comprises an absence of wireless coverage in a region.

12. The computer-readable storage medium of claim 11, wherein the probe response is provided when the SNR is greater than the threshold value, and the probe response is not provided when the SNR is less than the threshold value.

13. The computer-readable storage medium of claim 11, wherein the determining of the threshold value is based at least in part on the one or more other access points that are in wireless communication range of the access point.

14. The computer-readable storage medium of claim 13, wherein the determining of the threshold value is based at least in part on SNRs associated with the one or more other access points.

15. The computer-readable storage medium of claim 13, wherein the determining of the threshold value is based at least in part on an estimated wireless coverage provided by the one or more other access points.

16. The computer-readable storage medium of claim 13, wherein the threshold value increases when a number of the one or more other access points increases, and the threshold value decreases when the number of the one or more other access points decreases.

17. The computer-readable storage medium of claim 13, wherein, when determining the threshold value, the one or more operations comprise:

assigning the one or more other access points to classes; and calculating numbers of the other access points in the classes; and wherein the determining of the threshold value is based at least in part on the numbers of the other access points in the classes, a client-adjustment value associated with the electronic device, and a class-adjustment value.

18. The computer-readable storage medium of claim 17, wherein the class-adjustment value is based at least in part on a number of the other access points in at least one of the classes.

19. A method for selectively providing a probe response, wherein the method comprises:

by an access point:

receiving, at an interface circuit in the access point, a probe request associated with an electronic device; and in response to receiving the probe request, selectively providing, from the interface circuit, the probe response for the electronic device based at least in part on a signal-to-noise ratio (SNR) associated with the probe request and a threshold value, wherein the threshold value corresponds to a non-uniformity of wireless coverage by one or more access points that are in wireless communication range of the access point based at least in part on a spatial arrangement of the one or more access points; and wherein the non-uniformity of wireless coverage is based at least in part on locations of the one or more access points and comprises an absence of wireless coverage in a region.

20. The method of claim 19, wherein the probe response is provided when the SNR is greater than the threshold value, and the probe response is not provided when the SNR is less than the threshold value.

* * * * *